United States Patent
Farrell et al.

[11] Patent Number: 5,680,598
[45] Date of Patent: Oct. 21, 1997

[54] MILLICODE EXTENDED MEMORY ADDRESSING USING OPERAND ACCESS CONTROL REGISTER TO CONTROL EXTENDED ADDRESS CONCATENATION

[75] Inventors: Mark Steven Farrell, Pleasant Valley; Barry Watson Krumm, Poughkeepsie; Jennifer Serena Almoradie Navarro, Poughkeepsie; Charles Franklin Webb, Poughkeepsie, all of N.Y.

[73] Assignee: International Business Machines Corporation, Armonk, N.Y.

[21] Appl. No.: 414,158

[22] Filed: Mar. 31, 1995

[51] Int. Cl.⁶ ................................ E06F 9/34
[52] U.S. Cl. ............... 395/568; 395/571; 395/402; 395/421.1; 395/424.04
[58] Field of Search ................ 395/375, 402, 395/497.01, 412, 421.04, 421.05, 421.1, 387, 570, 571, 568

[56] References Cited

U.S. PATENT DOCUMENTS

| | | | |
|---|---|---|---|
| 3,866,183 | 2/1975 | Lange | 395/733 |
| 4,361,868 | 11/1982 | Kaplinsky | 395/402 |
| 4,388,685 | 6/1983 | Kotok et al. | 395/402 |
| 4,612,612 | 9/1986 | Woffinden et al. | 395/403 |
| 4,638,426 | 1/1987 | Chang et al. | 395/421.06 |
| 4,731,739 | 3/1988 | Woffinden et al. | 395/250 |
| 4,761,733 | 8/1988 | McCrocklin et al. | 395/421.02 |
| 4,797,814 | 1/1989 | Brenza | 395/403 |
| 4,799,222 | 1/1989 | Barlow et al. | 371/51.1 |
| 4,811,215 | 3/1989 | Smith | 395/390 |
| 4,901,233 | 2/1990 | Liptay | 395/394 |
| 5,023,776 | 6/1991 | Gregor | 395/449 |
| 5,129,071 | 7/1992 | Yamagata et al. | 395/406 |
| 5,136,696 | 8/1992 | Beckwith et al. | 395/587 |
| 5,142,634 | 8/1992 | Fite et al. | 395/578 |
| 5,226,164 | 7/1993 | Nadas et al. | 395/800 |
| 5,247,631 | 9/1993 | Hilton et al. | 395/402 |
| 5,276,848 | 1/1994 | Gallagher et al. | 395/448 |
| 5,280,593 | 1/1994 | Bullions, III et al. | 395/384 |
| 5,341,484 | 8/1994 | Tanaka et al. | 395/400 |
| 5,371,867 | 12/1994 | George et al. | 395/406 |
| 5,420,992 | 5/1995 | Killian et al. | 395/800 |
| 5,423,013 | 6/1995 | Baum et al. | 395/490 |

OTHER PUBLICATIONS

IBM/TDB vol. 35 No. 4A (Sep. 1992) pp. 451-454: Milli--Code Bullion, Chang, Meltzer, Nadas & Pedersen.

*Primary Examiner*—Parshotam S. Lall
*Assistant Examiner*—Viet Vu
*Attorney, Agent, or Firm*—Lynn L. Augspurger; Laurence J. Marhoefer

[57] ABSTRACT

A millicode instruction loads a millicode address extension register with extended address bits, and an operand access control register that signals when a logical address is to be extended by the extra bits, and when it should be treated as only a 31 bit address.

4 Claims, 2 Drawing Sheets

5,680,598

MILLICODE EXTENDED MEMORY ADDRESSING USING OPERAND ACCESS CONTROL REGISTER TO CONTROL EXTENDED ADDRESS CONCATENATION

BACKGROUND OF THE INVENTION

1. Field of the Invention

This invention relates to improvements in pipelined computer processors that execute relatively simple instructions in hardware controlled execution units and execute relatively complex instructions in a milli-mode architected state with vertical microcode (i.e. millicode) routines executing in the same hardware controlled execution units. More particularly, this invention relates to an addressing scheme that allows a small (e.g. 31 bit) millicode address to address a large physical storage (e.g. larger that 2 gigabytes).

2. Cross Reference to Related Applications

The present United States patent application is related to the following copending United States patent applications which are assigned to the assignee of the present application, and which are incorporated herein by reference.

application Ser. No. 08/414,154, filed Mar. 31, 1995 (attorney Docket No. PO9-94-045), entitled "Specialized Millicode Instruction."

application Ser. No. 08/414,821, filed Mar. 31, 1995 (attorney Docket No. PO9-94-054), entitled "Millicode Read-Only Storage With Entry Point Patch Control."

application Ser. No. 08/414,977, filed Mar. 31, 1995 (attorney Docket No. PO9-94-056), entitled "Hardware Retry Trap for Millicoded Processor"

application Ser. No. 08/414,812, filed Mar. 31, 1995 (attorney Docket No. PO9-94-061), entitled "Mapping Processor State into A Millicode Addressable Register Space."

application Ser. No. 08/414,164, filed Mar. 31, 1995 (attorney Docket No. PO9-94-062), entitled "Linking Program Access Register Number With Millicode Operand Access."

application Ser. No. 08/414,975, filed Mar. 31, 1995 (attorney Docket No. PO9-94-069), entitled "Priority and Recovery Method For Serialization of System Quiesce State."

DESCRIPTION OF THE PRIOR ART

Instruction sets used in computer systems employing so-called Complex Instruction Set Computing (CISC) architecture include both simple instructions (e.g. Load, or Add) and complex instructions (e.g. Program Call, or Load Address Space Parameters). As an example to which the invention has particular relevance, see "IBM Enterprise Systems Architecture/390 Principles of Operation" (Publication Number SA22-7201-02, available from IBM Corporation, Armonk, N.Y.), which is incorporated herein by reference in its entirety. As these computer systems (e.g. IBM System 390) have become more powerful, larger percentages of the instruction set have been implemented using hardware execution units to increase the systems performance. Conventionally, the complex functions are implemented in microcode because building hardware execution units to execute them is expensive and error prone.

Implementing complex functions in microcode provides flexibility to fix problems and expandability in that additional functions can be included later. In certain prior art machines, where much of the processor is hardware controlled, a dedicated microprocessor based execution unit is often provided in order to implement the complex functions. This unit can be microprogrammed to execute complex instructions and complex functions such as handling interrupt conditions.

More recently, prior art proposals have been advanced for machines with a so-called milli-mode operating capability; see, for example, IBM Technical Disclosure Bulletin Vol. 35, No. 4A of September 1992, incorporated herein by reference, and U.S. Pat. Nos. 5,280,593 and 5,226,164 assigned to the assignee of this invention and also incorporated herein by reference.

A milli-mode operation enables implementation of complex functions in a large, hardware controlled, pipelined, general purpose digital computer without a microprocessor. Milli-mode implements these complex functions with the flexibility provided by firmware and avoids a packaging problem introduced by the inclusion of microprocessor hardware. Rather than a microprocessor, milli-mode uses the preexisting dataflow and hardware controlled execution units of a pipelined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions.

Milli-mode detection logic in the instruction decode logic detects the requirement to enter milli-mode, and this causes millicode routines to be fetched. The millicode routines are decoded by the decoder hardware and dispatched for execution in the same way as the architected macro-instructions (system-mode instructions).

Practically all of the architected macro-instructions that are implemented as hardware controlled instructions can be executed in milli-mode. The set of instructions available in milli-mode can be considered to be an alternate architecture that the processor can execute.

The IBM ESA/390 architecture provides a maximum address of 31 bits as a logical address when addressing main memory. This 31-bit address can address a maximum of 2 gigabytes of main storage. With advances in storage technology it is now often required to address more than 2 gigabytes of storage in one processing complex.

U.S. Pat. No. 5,371,867 assigned to the assignee of this application and incorporated herein by reference, discloses a window addressing facility that allows instruction operands having small addresses (e.g. 31 bits) to address a large store (e.g. more than 2 gigabytes). Here, replacement address registers are used, which can hold addresses that are greater than 31 bits. Other compare registers hold 31 bit addresses. When a logical address matches the address held in one of the compare registers, the logical address is replaced by the address in the corresponding replacement address register.

With millicode as the processor licensed internal code, the logical addressing scheme is the same as ESA/390 with a maximum 31 bit address. At the same time millicode must be able to address more than 2 gigabytes of storage. At the same time the registers required for the window addressing facility are architected for the use of system manager software, not the internal millicode. The registers defined by the window addressing facility could be saved and restored whenever millicode needed to access greater than 2 gigabytes, but this adversely affects system performance.

An object of this invention is provision of a millicode addressing scheme that provides rapid access to a large physical storage.

Briefly, this invention contemplates the provision of a millicode address extension register, which millicode loads with extended address bits, and an operand access control register that signals when a logical address is to be extended by the extra bits, and when it should be treated as only a 31 bit address. The use of an operand access control register to modify millicode access to operand storage is disclosed more fully in copending application Ser. No. 07/996,264, filed Dec. 23, 1992, entitled "Method and System for Controlling References to System Storage" (attorney docket PO9-92-040), assigned to the assignee of this application and incorporated herein by reference.

A conventional storage controller contains standard logic circuits used to control fetching and storing of instructions and operands. The storage controller contains the logic circuits used to convert an address into an absolute address that can be used for storage reference. A field is provided in the operand access control register to indicate when extended absolute addressing is to be used. With the extended address bits loaded into the address extension register, a millicode instruction sets the extended absolute addressing mode field in the operand access control register to indicate extended absolute addressing. The millicode storage request to the storage controller specifies the low-order 31 bits of the address as the logical operand address. In response to the operand access control register indication of extended absolute addressing, the storage controller logic concatenates the extended address bits with the operand logical address to form a full (i.e. extended) absolute address. This extended absolute address is used to access storage in the same manner as an extended absolute address of the type resulting from an extended address transformation via the window addressing facility described in the aforementioned U.S. Pat. No. 5,371,867. If the operand access control register does not specify an extended absolute addressing mode, the storage access control ignores the extended address bits and processes the access request using the 31-bit logical address with normal access controls.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

This following exemplary embodiment of the invention is applicable in the overall context of a system generally conforming to IBM 390 system architecture. A more detailed description of the conventional elements of such a 390 system processor can be found, for example, in U.S. Pat. No. 4,901,233 to John S. Liptay, assigned to the same assignee as the present invention, and incorporated by reference, in its entirety, as if printed in full below. While the System 390 environment will be used as an example, it should be understood that the present invention is also readily applicable to other IBM (e.g. IBM System 370) and non-IBM architectures as well.

While not limited thereto, the invention is particularly well suited for use in conjunction with the enhanced error recovery system described in copending application attorney docket PO9-93-035, Ser. No. 08/149,260, filed Nov. 9, 1993, assigned to the assignee of this application, and also incorporated herein by reference.

Figure 1:
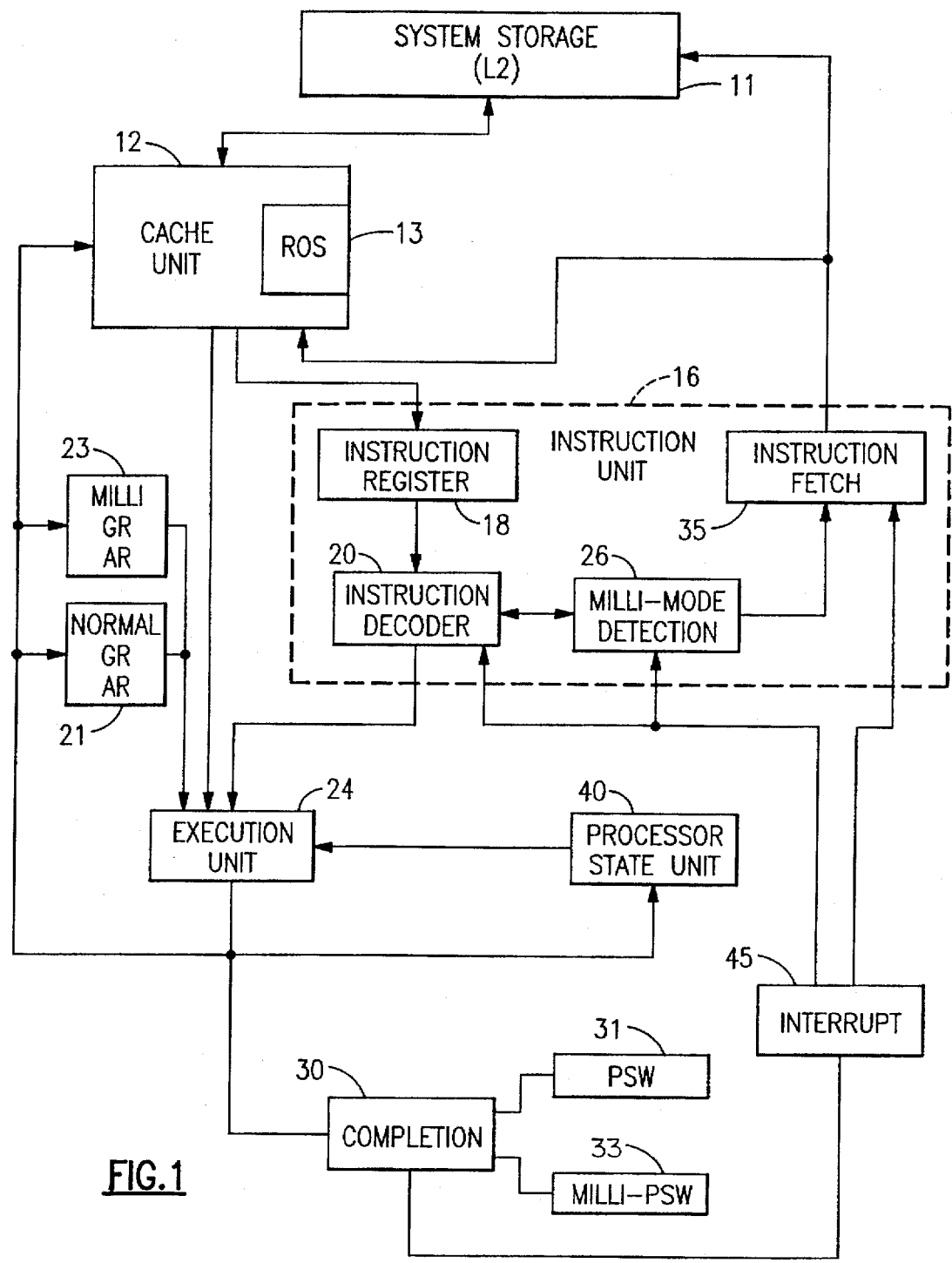
FIG. 1 is a block diagram illustrating the components of a millicode system in accordance with a preferred specific embodiment of the invention.

Referring now to FIG. 1, elements of a system relevant to this invention include a system storage 11, and a cache memory unit 12. The system storage 11 contains the instructions that the processor is executing as well as the data those instructions are manipulating. The cache memory unit 12, which includes a copy of the data and instructions the processor is presently executing, in this preferred embodiment is a split cache providing interleaved double word addressing. The cache memory 12 logically includes a contiguously addressable read only store 13, in which code for executing certain frequently invoked milli-mode routines is stored.

An instruction unit subsystem 16 includes an instruction buffer (not shown in FIG. 1), instruction registers 18 and an instruction decoder 20. The instruction unit subsystem receives macro-instructions, millicode instructions, and data from the cache memory unit 12. Instructions are parsed and placed into the instruction registers 18. The decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers 21 for normal macro-code instruction execution and to a set of general purpose registers and access registers 23 for millicode instruction execution. Control logic controls the exchange of data between the two sets of registers when beginning or terminating a millicode routine. Milli-mode detection logic 26 is coupled to the instruction registers and detects when a macro-instruction, which is being decoded, is of a type that is to be interpreted in a milli-mode operation. When this occurs, the milli-mode detection logic 26 generates an entry point address and passes this address along to the instruction fetch control logic 25 and places the decoder 20 into a milli-mode operating state. In this state the decoder is enabled to decode milli-mode instructions. Milli-mode instructions are vertical microcode, consisting of a mixture of regular microcode instructions and special milli-mode only instructions, all of which can be executed in the execution unit 24. The special instructions provide control functions needed by the millicode routines. The set of millicode routines reside outside of the program addressable storage.

The system effects of an executed instruction are architecturally visible in the completion logic 30. Signal lines between the completion logic 30 and the decoder 20 allow the decoder 20 to keep track of instruction completion. A program status word (PSW) in register 31 controls execution of the macro-program. Similarly, the system also includes a milli-PSW register 33, which controls execution of the milli-routine. Both the execution unit 24 and the completion logic 30 are connected to read from/write to the PSW and the milli-PSW registers. Thus, at any given point the execution units or the completion logic can read or update the appropriate one of the PSW and/or milli-PSW registers. A processor state unit 40 maintains the entire updated status of the architected system both in regular mode and milli-mode operation. In the event of a detected error, the processor state unit 40 provides a resource to recreate the status of the system from a check point state in order to allow a retry of the error causing operation.

Milli-mode is enabled when the milli-mode detection logic 26 recognizes that the macro-instruction being decoded is to be implemented with millicode. In response to this recognition, the detection logic 26 signals the decoder 20, the instruction fetch controls 35 and register controls in the execution unit 24. In response to the milli-mode recognition signal from the detection logic 26, the decoder 20 suspends macro-mode decoding, the execution unit register control copies the contents of the GPRs 21 to the milli-registers 23 and causes the system to subsequently use the milli-registers 23. The milli-mode detection logic 26 generates a millicode entry point address.

The entry point address (generated by the milli-mode detection logic 26) is used by the control logic 35 to address the cache 12. Milli-instructions from the cache are sent to the instruction registers 18 where the decoder 20 decodes them and schedules them for execution.

When the processor enters milli-mode, it executes and completes the macro-instructions already in the pipeline conceptually prior to the instruction that caused entry into milli-mode. As the processor completes the macro-instructions, it updates the appropriate GPRs. At the same time, the processor decodes and executes the milli-instructions that implement the macro-instruction that caused entry into milli-mode.

At some point the macro-instruction immediately prior to the instruction that caused entry to milli-mode will be indicated completed in the completion logic 30. Only then does the processor begin to complete the milli-instructions. The processor then continues decoding, executing and completing the milli-instructions.

Eventually, the detection logic 26 recognizes a millicode END (MEND) milli-instruction. When the detection logic 26 detects a MEND milli-instruction, it causes the processor to cease fetching milli-instructions. Further, when MEND is detected, the detection logic puts the decoder in macro-mode and causes the processor to begin fetching macro-instructions. Millicode explicitly updates all registers, so there is no transfer of register content when going from milli-mode operation to regular operation.

Completion of a MEND milli-instruction causes the processor completion logic to begin completing macro-instructions.

The processor can also enter milli-mode in response to an interrupt. When the completion logic detects an interrupt, the interrupt priority logic 45 determines that an interrupt is to be serviced and it signals the instruction fetch unit, causing the decoder to initiate milli-mode. The recognition of an interruption condition causes the processor to halt macro-mode execution at the next interruptible point. The interrupt priority logic 45 also generates control inputs which are used by the milli-mode detection logic to generate an entry point address with which to address the cache. These milli-instructions are sent to the instruction registers where the decoder decodes them and schedules them for execution at the appropriate hardware execution elements.

The processor proceeds to decode, execute and complete the milli-instruction in the milli-routine for interrupts. Eventually, the decoder recognizes a MEND milli-instruction. This causes the decoder to stop decoding in milli-mode. Depending on whether or not there are additional interrupts that require servicing, the decoder hardware will either redo the interrupt process or return to decoding macro-instructions from the cache.

Figure 2:
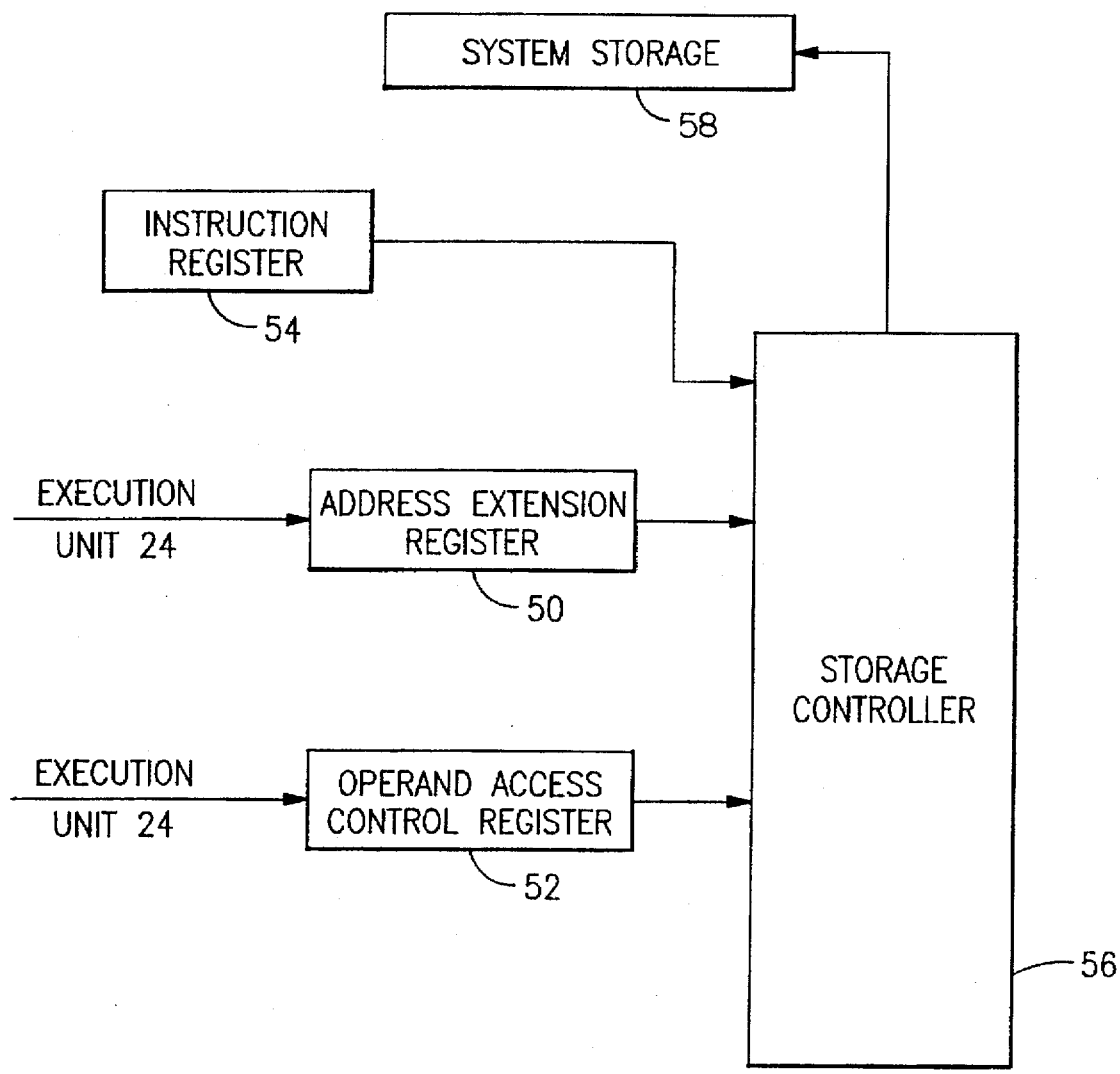
FIG. 2 is a more detailed block diagram of elements of a system in accordance with the teachings of this invention.

Referring now to FIG. 2, the instruction unit 16 has a millicode address extension register 50, which millicode loads with extended address bits. An operand access control register 52 in the instruction unit 16 signals when a logical address input from instruction register 54 is to be extended by the extra bits in register 50 and when it should be treated as only a 31 bit address. The use of an operand access control register to modify millicode access to operand storage is disclosed more fully in copending application Ser. No. 07/996,264, filed Dec. 23, 1992 (attorney docket PO9-92-040), assigned to the assignee of this application and incorporated herein by reference.

A conventional storage controller 56 contains standard logic circuits used to control fetching and storing of instructions and operands and the logic circuits used to convert an address into an absolute address that can be used for reference to system storage 58. A field in the operand access control register 52 indicates when extended absolute addressing is to be implemented. With the extended address bits loaded into the address extension register 50, a millicode instruction sets the extended absolute addressing mode field in the operand access control register 52 to indicate extended absolute addressing. The millicode storage request from instruction register 54 to the storage controller 56 specifies the low-order 31 bits of the address as the logical operand address. In response to the operand access control register 52 indication of extended absolute addressing, the storage controller logic concatenates the extended address bits in register 50 with the operand logical address from register 54 to form a full (i.e. extended) absolute address. This extended absolute address is used to access storage in the same manner as an extended absolute address of the type resulting from an extended address transformation via the window addressing facility described in the aforementioned U.S. Pat. No. 5,371,867. Here it should be noted that the access control register 52 and the extension register 50 are mapped into the processor state unit 40. If the operand access control register does not specify an extended absolute addressing mode, the storage access control ignores the extended address bits and processes the access request using the 31 bit logical address with normal access controls.

While the invention has been described in terms of a single preferred embodiment, those skilled in the art will recognize that the invention can be practiced with modification within the spirit and scope of the appended claims. A "small address" is herein defined to use any of the common address sizes of 16, 20, 24, 31 or 32 bits. A "large address" is herein defined to have a size of greater than the small address size being used.

Having thus described our invention, what we claim as new and desire to secure by Letters Patent is as follows:

1. In a pipelined computer processor, which executes a simple instruction set in a hardware controlled execution unit and executes a complex instruction set in a milli-mode architected state with a millicode sequence of simple instructions in said hardware controlled execution unit, an extended addressing system for addressing a large physical storage with a small millicode address, comprising in combination:

a storage controller means for fetching and storing instructions and operands and for converting instruction and operand addresses into absolute addresses to address said large physical storage;

a millicode accessible operand access control register means coupled to said storage controller means for inputting an extension control command to said storage controller means in order to implement extended absolute addressing;

an address extension register means coupled to said storage controller means for inputting to said storage controller means address extension data;

instruction register means coupled to said storage controller means for inputting to said storage controller means said small millicode address; and said storage controller means concatenating said small millicode address from said instruction register means with said address extension data in response to said extension control command from said millicode accessible operand access control register.

2. In a pipelined computer processor, an extended addressing system for addressing a large physical storage with a small millicode address as in claim 1 further including a processor state unit and means for copying the contents of said operand access control register and the contents of said address extension register to said processor state unit.

3. In a pipelined computer processor, an extended addressing system for addressing a large physical storage with a small millicode address as in claim 1 wherein the millicode instruction sets a field in said millicode accessible operand control address register for an extended addressing mode of operation.

4. In a pipelined computer processor, an extended addressing system for addressing a large physical storage with a small millicode address as in claim 2 wherein the millicode instruction sets a field in said millicode accessible operand control address register for an extended addressing mode of operation.

* * * * *